United States Patent Office 3,287,032
Patented Nov. 22, 1966

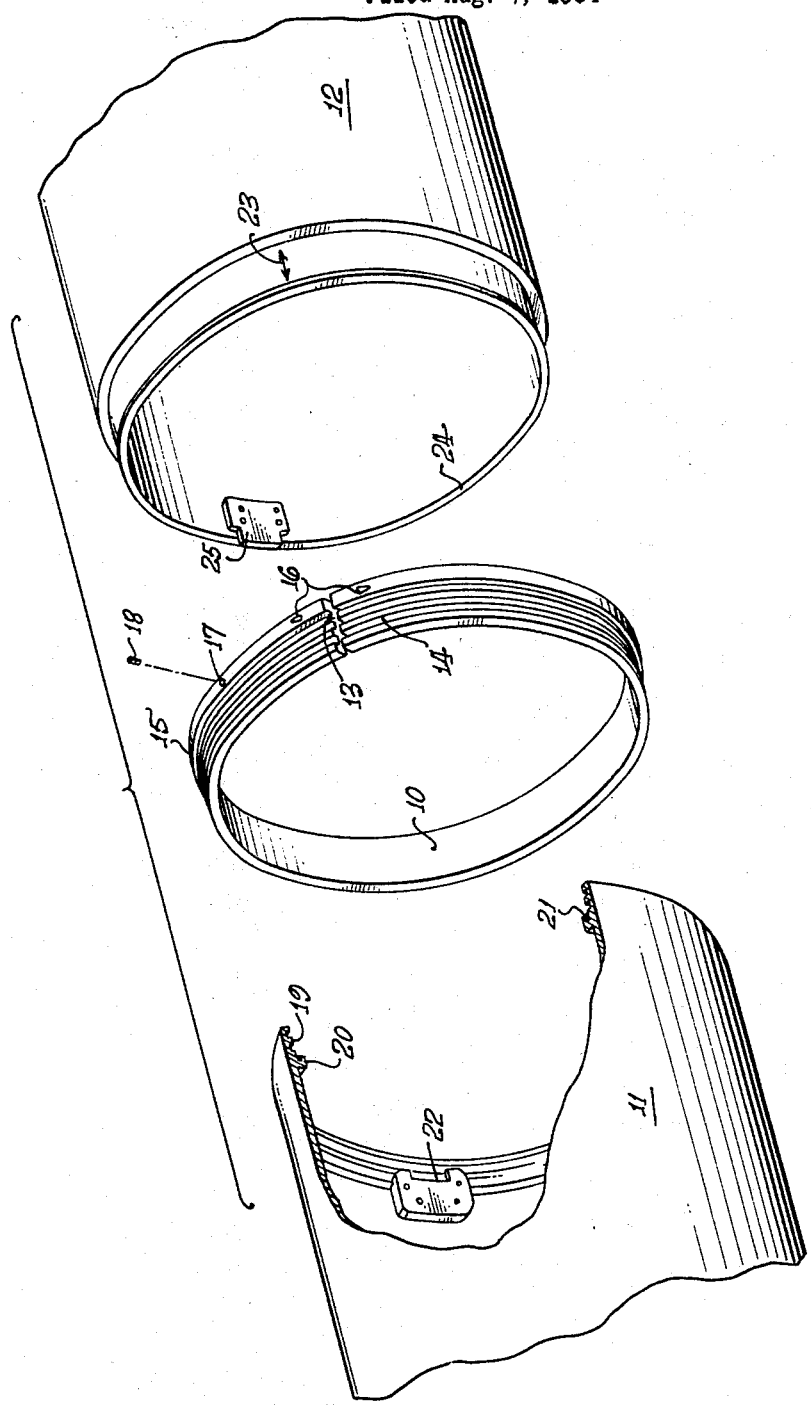

---

3,287,032
COUPLING FOR TUBULAR MEMBERS
Jesse L. Kraybill, Claremont, Calif., assignor to General Dynamics Corporation, Pomona, Calif., a corporation of Delaware
Filed Aug. 7, 1964, Ser. No. 388,118
3 Claims. (Cl. 285—39)

This invention relates to section joints or couplings, particularly to section joints or couplings for tubular members, and more particularly to section joints or couplings for missile sections.

This invention is described with special reference to its use as part of a missile, although it will be apparent that it may be used in other devices.

A typical modern military missile may be made up of separate sections, for example: a warhead section, a guidance section, and a motor section. The sections may be manufactured and stored as separate units, to be assembled, and sometimes disassembled, in the field. It is therefore desirable that mechanism be provided for quickly locking the two sections together to form a rigid unit. It is a further requisite that the mechanism be operable without special tools, that it not materially increase the weight or the radial or other dimensions of the missile, that it retain the sections in alignment while preventing rotary as well as longitudinal movement therebetween, and that it lend itself to rapid disassembly of the missile.

Therefore, it is an object of this invention to provide a coupling for tubular members.

A further object of the invention is to provide a joint for tubular members which utilizes a threaded split ring.

Another object of the invention is to provide a joint for circular sections which forms a tightly sealed unit with high structural capabilities.

Another object of the invention is to provide a coupling for tubular members having a threaded ring which tightens or loosens by pulling action thus providing better control of joint tightness.

Other objects of the invention not set forth above will become readily apparent from the following description and drawing in which the single figure is an exploded view of the invention.

The invention relates to a section joint for tubular members such as missile sections and involves attaching an externally threaded, radially split ring to an undercut and flanged end portion of one of the missile sections, then drawing the one section into the other section axially by threading the ring into internal threads provided in the other section. The ring rotates freely within its undercut channel area and a rim is provided on the ring so that a turning tool may be applied thereto. In final position the rim is flush with the other surfaces of the missile sections. Suitable detent means are provided to prevent relative rotation of the missile sections as the ring is being turned to bring the sections together.

Referring now to the drawing, a threaded radially split ring 10 is shown between tubular sections 11 and 12 which, for example, may constitute the aft end of the guidance section and the forward end of the motor section, respectively, of a missile, ring 10 being adapted to interconnect sections 11 and 12.

Ring 10 is split as indicated at 13 and is provided with external threads 14, a rim portion 15 having notches 16 therein for tightening or loosening the assembly, and a hole 17 adapted for threaded receipt of a set screw 18.

Section 11 is provided with internal threads 19 which terminate against an inwardly extending rim or stop 20, stop 20 being provided with a sealing member at 21. A female portion or slot 22 of a detent unit is fixed to section 11 behind stop 20 by any conventional means.

Section 12 is provided with a reduced external diameter portion or groove 23 and a rim or shoulder portion 24 which is of substantially the same external diameter as the internal diameter of threads 14 of ring 10 and is adapted to form the seat for the sealing member 21 of section 11 when the sections are interconnected by ring 10. A male portion or key 25 of the detent unit is fixed to section 12 by conventional means so that it interconnects with the female portion 22 of section 11 when said sections are brought together to prevent rotation of section 11 with respect to section 12.

In assembly of the invention, the threaded ring 10 is sprung open at the saw cut 13 to a larger diameter and placed in the groove 23 of section 12. It is then relaxed to original diameter and held in place in the groove 23 by spring effect in closing to the original diameter and is also free to turn in the groove 23. The sections 11 and 12 are brought together, such that the key 25 starts into slot 22 of the detent unit. The threaded ring 10 is then rotated so that its threads 14 mate with the threads 19 of section 11 which contains seal 21. The threaded ring 10 is then torqued by placing a suitable torque wrench in notches 16 which requires the threaded ring 10 to be pulled through approximately one half of its periphery for tightening and loosening. When tightened, seal 21 positioned on stop 20 is drawn up and deflected against rim 24 of section 12 to produce a sealed joint. Set screw 18 is then tightened against groove 23. The invention thus produces a joint which provides a sealed, structurally tight, and vibration free assembly of missile sections.

The invention provides the following advantages: (1) a missile body joint composed of few load transmitting parts, consisting basically of threaded ring 10 and structural sections 11 and 12; (2) all parts of the missile joint are integral, there being no loose parts which may be misplaced or lost during assembly and disassembly; (3) space requirements are minimum allowing for more internal package volume; (4) missile body loads are transmitted through the joint by the entire circular periphery of the joint; (5) a joint which includes a ring that is saw cut to allow for easy assembly and is held in place by its own spring strength; (6) the joint is tightened or loosened by pulling the threaded ring rather than pushing due to the wrench notches; (7) a joint utilizing a threaded split ring having unique, one-way for tightening, one-way for loosening, torque wrench notches which provide a closing action to the saw cut in the ring, thus reducing the radial force on the threads which, in turn, reduces circumferential friction between the threads allowing more accurate control of the axial preload of the joint for a specific torque wrench reading; and (8) a joint having unique torque wrench notches which provides for pulling approximately one half of the periphery of the threaded ring when turned, thus the ring is guided in the direction of the torquing force preventing any tendency to catch or gouge along the surfaces of the sections being interconnected.

It has thus been shown that the joint of the invention is suitable for circular sealed containers of all types including missile section containers, instrument containers, fluid and bulk material containers, etc.

While a specific embodiment has been illustrated and described, modifications will become apparent to persons skilled in the art, and it is intended to cover in the appended claims all such modifications as come within the spirit and scope of the invention.

What I claim is:
1. A coupling for tubular members comprising: a pair of tubular sections having substantially the same external surface diameters; one of said tubular sections including an internally threaded end portion and a stop member adjacent said internal threads, said stop member being comprised of an annular internally extending flange, said stop member being provided with a sealing member on the side of said annular flange adjacent said internal threads; the other of said tubular sections being provided with a reduced external diameter end portion, said reduced external diameter end portion including an annular groove and a shoulder portion, said shoulder portion of said reduced external diameter end portion being intermediate said groove and the terminal end of said end portion; a one piece resilient ring having a split therein adapted to be expanded over said shoulder portion and positioned in said groove of said other tubular section and rotatable with respect thereto, said split ring including a portion provided with external threads adapted to engage the internal threads of said one tubular section, said split ring also including a rim portion having notches therein for turning the same, said rim portion of said split ring having an external surface of substantially the same diameter as the external surface of said tubular sections; and detent means having members connected to said tubular sections for preventing relative rotation therebetween; whereby turning of said split ring when positioned in said groove pulls said one tubular section toward said other tubular section due to the threaded engagement between said split ring and said one tubular section so that at least said sealing member in said stop member of said one tubular section abuts against the terminal end of said reduced diameter end portion of said other tubular member, and the external surfaces of said tubular members and said rim portion of said split ring form a substantially continuous surface.

2. A coupling comprising: two body portions, one of said body portions having one end thereof provided with internal threads and an annular inwardly extending stop member adjacent said threads, said stop member being provided with a sealing means on the side thereof adjacent said internal threads; the other of said body portions having a reduced diameter end portion, said end portion being provided with a groove; one piece resilient ring means having a split therein adapted to be expanded for positioning in the groove of said end portion of said other body portion, said split ring means including an externally threaded portion adapted to threadedly interconnect with the internal threads of said one body portion, said split ring means also including a rim portion adapted for rotating said split ring means; detent means for preventing relative rotation between said body portions, said detent means including a female portion operatively connected to said one of said body portions and a male portion operatively connected to the other of said body portions; whereby turning of said split ring means pulls said body portions toward one another due to the threaded engagement between said one body portion and said split ring means when said split ring means is positioned in said groove of said other body portion so that the members of said detent means are engaged to prevent rotation between said body portions, and so that the end of said other body portion abuts against said sealing means of said one body portion.

3. A coupling for tubular members comprising: a pair of tubular sections, one of said tubular sections including an internally threaded end portion and a stop member adjacent the internal threads, said stop member being provided with a sealing member on the side thereof adjacent said internal threads; the other of said tubular sections including a reduced external diameter shoulder at one end thereof and a groove adjacent said shoulder, said groove being a smaller external diameter than said shoulder; a one piece expandable ring member having a longitudinal split therein adapted to be expanded over said shoulder for positioning same in said groove of said other tubular section and rotatable with respect thereto, said split ring member being provided with external threads adapted to engage the internal threads of said one tubular section, said split ring member also including a rim portion having notches in the external cylindrical surface thereof for turning said ring member; a detent means for preventing relative rotation between said tubular sections, said detent means including a female member operatively connected to said one tubular section and a male member operatively connected to said other tubular section; whereby turning of said split ring member pulls said one tubular section toward said other tubular section due to the threaded engagement so that said members of said detent means are engaged, said sealing member of said one tubular section abuts against said shoulder of said other tubular member, and the external surfaces of said tubular members and said rim portion on said split ring member form a substantially continuous surface.

References Cited by the Examiner

UNITED STATES PATENTS

| 39,700 | 8/1863 | Morrison | 285—280 X |
|---|---|---|---|
| 590,771 | 9/1897 | Pike | 285—356 X |
| 1,441,138 | 1/1923 | Westervelt | 285—403 X |
| 1,736,145 | 11/1929 | Anderson | 285—393 |
| 1,774,986 | 9/1930 | MacKenzie | 285—330 X |
| 1,799,941 | 4/1931 | Wulle | 285—404 X |
| 1,814,481 | 7/1931 | Metcalf et al. | 285—393 X |
| 2,226,547 | 12/1940 | Boynton | 285—321 X |
| 2,238,535 | 4/1941 | Meyer et al. | 285—404 X |
| 2,372,223 | 3/1945 | Nagel | 285—393 X |
| 2,468,783 | 5/1949 | Schwartz | 285—356 X |
| 2,569,333 | 9/1951 | Peterson | 285—39 X |
| 3,100,121 | 8/1963 | Hillmer | 285—321 |
| 3,195,928 | 7/1965 | Pasternack | 285—321 X |

FOREIGN PATENTS 520,767  3/1955  Italy.

CARL W. TOMLIN, *Primary Examiner.*

THOMAS F. CALLAGHAN, *Examiner.*